United States Patent [19]

Norman

[11] 4,040,792

[45] Aug. 9, 1977

[54] GAS BURNER FOR CARBON BLACK REACTOR

[75] Inventor: Don T. Norman, Sulphur, La.

[73] Assignee: Continental Carbon Company, Houston, Tex.

[21] Appl. No.: 703,025

[22] Filed: July 6, 1976

[51] Int. Cl.² .............................................. C09C 1/50
[52] U.S. Cl. .................................. 23/259.5; 423/450; 423/456
[58] Field of Search ............... 23/259.5; 423/450, 455, 423/456, 457, 458

[56] References Cited

U.S. PATENT DOCUMENTS

| | | | |
|---|---|---|---|
| 2,801,157 | 7/1957 | Campbell et al. | 23/259.5 |
| 2,976,128 | 3/1961 | Latham, Jr. et al. | 23/259.5 |
| 3,342,556 | 9/1967 | Ruble | 23/259.5 X |
| 3,376,111 | 4/1968 | Stegelman | 423/458 |

FOREIGN PATENT DOCUMENTS

| | | | |
|---|---|---|---|
| 635,292 | 1/1962 | Canada | 423/455 |
| 286,207 | 12/1928 | United Kingdom | 23/259.5 |

Primary Examiner—Joseph Scovronek
Assistant Examiner—Roger F. Phillips
Attorney, Agent, or Firm—Jerry B. Peterson

[57] ABSTRACT

A gaseous fuel burner for a carbon black reactor comprising a hollow annular metallic ring having a plurality of holes for discharge of fuel radially into a stream of combustion air immediately downstream (or upstream) of a turbulence-creating orifice. The air and fuel pass through and are intimately mixed in a cylindrical refractory mixing chamber adjacent the ring. The ring is affixed to a metallic mounting plate so that the burner and plate are cooled by incoming air supplied to a chamber located between said plate and the upstream end of the reactor.

10 Claims, 1 Drawing Figure

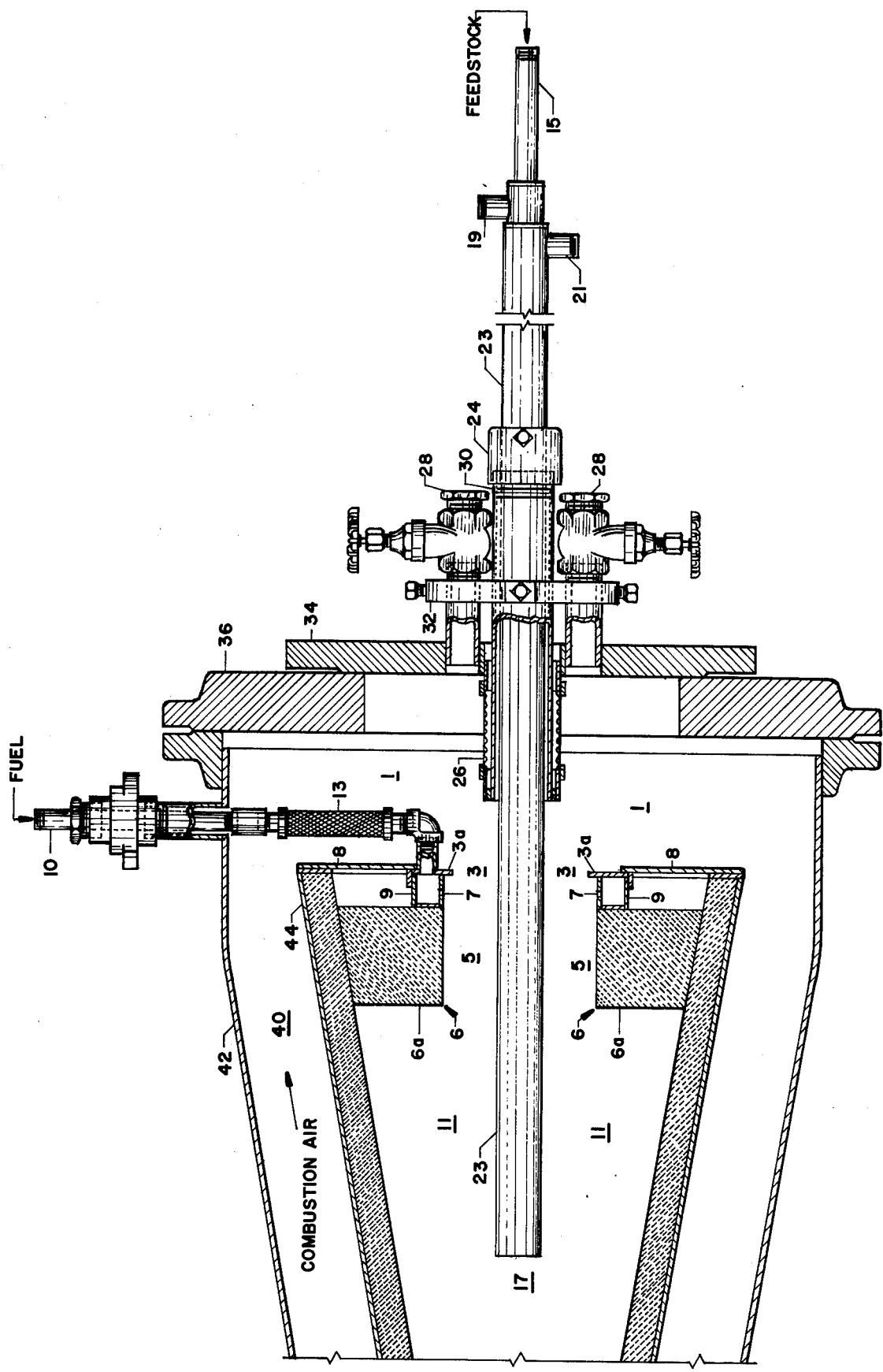

GAS BURNER FOR CARBON BLACK REACTOR

BACKGROUND OF THE INVENTION

1. Field of the Invention

This invention concerns the production of carbon black by the injection of suitable liquid hydrocarbon feedstock into a reaction zone containing high-temperature products of the combustion of a suitable gaseous hydrocarbon fuel. More particularly, this invention consists of an improved gas burner for a carbon black reactor.

2. Description of the Prior Art

There is considerable prior art disclosing gas burners for carbon black reactors, because gas is the conventional fuel which has been used in the oil furnace carbon black process. Examples of burners in which the gas is injected (from the vicinity of the axis of the reactor) outwardly and radially into the combustion air stream are disclosed in U.S. Pat. Nos. 2,686,560; 2,825,632-3; 2,431,075, 3,443,761; and 3,741,165. A burner in which the gas is injected inwardly and radially from a ring into the combustion air stream is shown in U.S. Pat. No. 3,005,689. A burner in which the gas is injected downstream and axially through a ring into an air stream is disclosed in U.S. Pat. No. 3,376,111. A burner in which the gas is injected horizontally and axially through a ring into a straight-flowing air stream is shown in U.S. Pat. No. 3,057,688.

OBJECTS OF THE INVENTION

The principal objects of this invention are to provide a burner affording: a high level of combustion efficiency; a stable flame with low reactor vibration; mechanical soundness; easy operation; capability of being easily repaired or replaced; inexpensive construction; and operability for long periods without deterioration.

BRIEF SUMMARY OF THE INVENTION

This invention is a gaseous fuel burner for a carbon black reactor comprising a hollow annular metallic ring having a plurality of holes for discharge of fuel radially into a stream of combustion air immediately downstream of a turbulence-creating orifice. The air and fuel pass through and are intimately mixed in a cylindrical refractory mixing chamber adjacent the ring. The ring is preferably affixed to a metallic mounting plate so that the burner and plate are cooled by incoming air supplied to a chamber located between said plate and the upstream end of the reactor.

BRIEF DESCRIPTION OF THE DRAWING

The drawing is a longitudinal elevation, partly in section, illustrating a preferred embodiment of the invention comprising a combination of fuel burner, feedstock injection system, and carbon black reactor.

DESCRIPTION OF THE PREFERRED EMBODIMENTS

Combustion air (preferably preheated) enters air chamber 1 and passes through restriction or orifice 3 defined by circular member or lip 3a affixed to or a part of ring 9, creating turbulence in burner block tunnel 5 defined by refractory burner block 6. Directly downstream of orifice 3, gaseous fuel is injected radially inwardly through a plurality of holes 7 in hollow annular metallic ring 9 connected to fuel supply pipe 10. The fuel and air are mixed in mixing chamber or tunnel 5, and combustion commences in zone 11 downstream of tunnel 5. Alternately, lip 3a (hence orifice 3) could be positioned immediately downstream (rather than upstream) of fuel supply hole 7 between holes 7 and burner block 6.

A large backflow zone is located radially outward from the point where tunnel 5 meets rear combustion chamber wall 6a. This backflow of hot combustion products promotes very rapid igniition and complete combustion in a very short distance downstream from wall 6a. The combustion products and excess air leave the combustion zone intimately mixed and uniformly hotter than in previous burner designs such as those shown in U.S. Pat. No. 3,443,761. Combustion is smooth with a stable flame and low reactor vibration. The burner life is excellent as shown by continuous operation for eleven months without burner failure.

Ring 8 is preferably welded to metallic end plate 8 so that the ring can be cooled by heat transfer to plate 8, which in turn is cooled by incoming combustion air.

A braided metal hose 13 is preferably included to allow for differential heat expansion between reactor tube 44 and reactor shell 42.

Feedstock enters through outer pipe 15 and is injected into the reactor as for example at point 17 by spraying or other means. The spray nozzle (not shown) is preferably cooled by water entering (or exiting) pipe 19 and exiting (or entering) pipe 21 in the manner shown in U.S. Pat. No. 3,741,165. The position of pipe 23 is preferably adjustable by means of a sliding fit in closure member 24, as in the case of pipe 6 of said patent.

Other means of feedstock injection could be utilized. For example, the axial feedstock injection subassembly (as shown) could be replaced by a radial injection subassembly (not shown) at a point or points downstream of the combustion zone.

A positive seal is preferably accomplished by means of a stainless steel hose 26 suitably mounted as shown.

Pipe 30 is preferably aligned by a suitable centering plate 32.

Thus the burner preferably comprises two subassemblies:

1. Centering plate 32, face plate or flange 34, seal 26, and sight glass 28; and
2. Burner (ring 9), mounting plate (end plate 8), and refractory burner block 6. This arrangement lends itself to ease and low expense of fabrication and flexibility of operation and maintenance.

One operating advantage of this invention is improved visibility through the sight glasses to inspect the flame during operation. This occurs because of elimination of the circular disc 18 of U.S. Pat. No. 3,741,165.

Another advantage is smoother and more efficient combustion as a result of better mixing of fuel and air prior to initiation of combustion. Preliminary data tends to indicate that the improved combustion from the use of this invention facilitates the use of higher fuel/air ratios, which in turn provides beneficial effects upon yields, costs and product quality.

Another important advantage is longer burner life through less heat stress upon the metal burner parts.

As indicated above, the combustion air is preferably preheated. For example, air passes through an inlet (not shown) such as inlet 14 of U.S. Pat. No. 3,256,065 and passes through annulus 40 defined by housing or shell 42 and inner reactor tube 44 (preferably refractory lined as shown). Such arrangement is not essential in that air could be introduced directly into chamber 1 radially or tangentially from conduits (not shown) attached to shell 42 just upstream of plate 8 and downstream of end plate or flange 36.

Although reactor tube 44 is shown as converging in the downstream direction, such configuration is not essential to the use of this invention.

While I have thus described the preferred embodiments of the present invention, many variations will be suggested to those skilled in the art. The foregoing description should therefore not be considered limitative; and all such variations and modifications as are in accord with the principles described are meant to fall within the scope of the appended claims.

Having thus described my invention, I claim:

1. In combination with an elongate, substantially tubular carbon black reactor, a fuel burner assembly concentrically disposed within said reactor at the upstream end thereof, said burner assembly comprising:

a hollow annular metallic ring positioned coaxially within the reactor tube at its upstream end;

a fuel supply conduit being connected to said ring for supplying fuel to the hollow portion of said ring; said ring having a plurality of fuel supply holes positioned around the inner surface of said ring for discharge of fuel radially toward the axis of said reactor;

a refractory burner block defining a cylindrical tunnel coaxial with said reactor and downstream of said ring, the surface of said tunnel being aligned with the inner surface of said ring, the diameter of said tunnel being less than the diameter of said reactor tube;

a circular member or lip affixed to or a part of said ring, said lip defining an orifice of diameter less than the diameter of said cylindrical tunnel, said lip being positioned immediately upstream of said holes or positioned immediately downstream of said holes between said holes and said block;

means for passing combustion air through said orifice into said tunnel;

a combustion zone, within said reactor tube, downstream of said tunnel; and means for injecting feedstock into said reactor downstream of said tunnel.

2. The combination of claim 1 in which said ring is metallic and further including a circular metallic end plate for said burner assembly and reactor tube, said plate being affixed to said ring at the upstream surface of said ring, said plate having a central aperture of diameter greater than said orifice.

3. The combination of claim 1 in which said means for injecting feedstock comprises an axial feedstock injection subassembly inserted through said orifice.

4. The combination of claim 2 in which said means for injecting feedstock comprises an axial feedstock injection subassembly inserted through said orifice.

5. The combination of claim 1 in which said means for injecting feedstock comprises a subassembly for radial injection of feedstock at a point or points downstream of the combustion zone of the reactor.

6. The combination of claim 2 in which said means for injecting feedstock comprises a subassembly for radial injection of feedstock at a point or points downstream of the combustion zone of the reactor.

7. The combinaton of claim 1 including an annulus, between the reactor tube and a reactor housing or shell surrounding said reactor tube, for preheating of combustion air, said annulus being in open communication with an air chamber within the upstream end of the reactor, said air chamber being in open communication with said orifice.

8. The combination of claim 2 including an annulus, between the reactor tube and a reactor housing or shell surrounding said reactor tube, for preheating of combustion air, said annulus being in open communication with an air chamber within the upstream end of the reactor, said air chamber being in open communication with said orifice.

9. The combination of claim 3 including an annulus, between the reactor tube and a reactor housing or shell surrounding said reactor tube, for preheating of combustion air, said annulus being in open communication with an air chamber within the upstream end of the reactor, said air chamber being in open communication with said orifice.

10. The combination of claim 5 including an annulus, between the reactor tube and a reactor housing or shell surrounding said reactor tube, for preheating of combustion air, said annulus being in open communication with an air chamber within the upstream end of the reactor, said air chamber being in open communication with said orifice.

* * * * *